Oct. 27, 1970     M. H. MAURER     3,536,446
PRODUCTION OF SULFURIC ACID
Filed Sept. 26, 1967
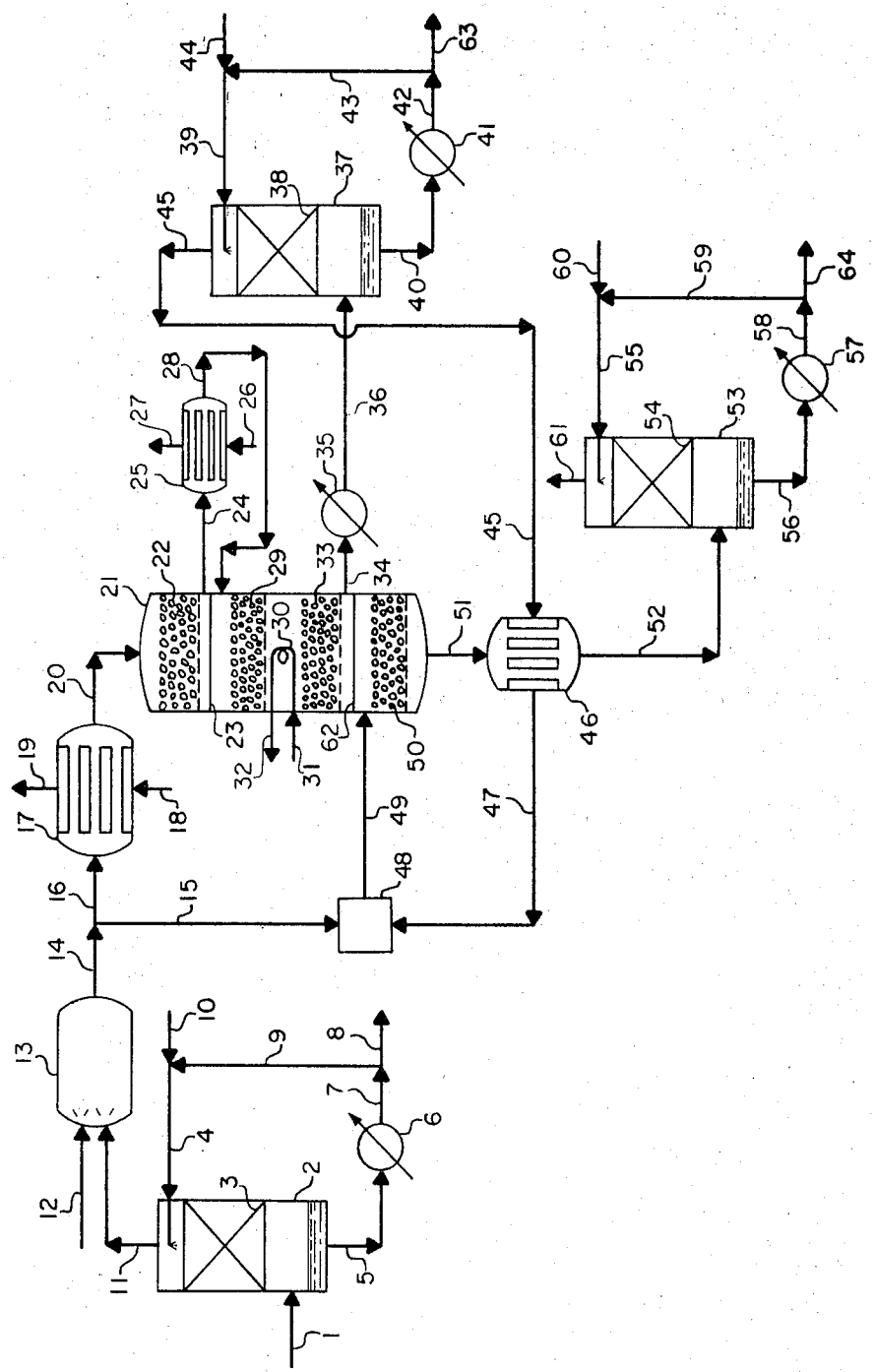
MICHAEL H. MAURER
INVENTOR.
BY *J. T. Chaboty*
AGENT

United States Patent Office

3,536,446
Patented Oct. 27, 1970

3,536,446
PRODUCTION OF SULFURIC ACID
Michael H. Maurer, New York, N.Y., assignor to Chemical Construction Corporation, New York, N.Y., a corporation of Delaware
Filed Sept. 26, 1967, Ser. No. 670,551
Int. Cl. C01b 17/76
U.S. Cl. 23—168                                    7 Claims

ABSTRACT OF THE DISCLOSURE

A sulfuric acid process is provided in which the initial hot process gas stream produced by sulfur combustion is divided into two portions. The first gas portion is cooled and a portion of its sulfur dioxide content is catalytically converted to sulfur trioxide, which is then absorbed in concentrated sulfuric acid solution to form further sulfuric acid. The residual first gas portion is heated by direct addition of the second gas portion, and the sulfur dioxide content of the resulting combined gas stream is catalytically converted to sulfur trioxide. The combined gas stream is cooled, and is then scrubbed with concentrated sulfuric acid solution to absorb sulfur trioxide and form additional sulfuric acid. The residual tail gas from the process is substantially free of sulfur oxides.

BACKGROUND OF THE INVENTION

Field of the invention

The invention relates to the production of sulfuric acid by a dual absorption procedure, in which a gas stream containing sulfur dioxide is catalytically processed to convert only a portion of the sulfur dioxide content to sulfur trioxide, which is absorbed in concentrated sulfuric acid. The residual gas stream is reheated to catalytic conversion temperature and the balance of the sulfur dioxide is catalytically converted to sulfur trioxide, which is absorbed in sulfuric acid solution. The invention is also applicable to existing sulfuric acid facilities in which most of the sulfur dioxide is converted to sulfur trioxide prior to a single absorption step. In this case, the hot second process gas portion is added to the tail gas from absorption, and passed through additional catalytic conversion means and a second absorption facility.

Description of the prior art

Dual absorption processes for sulfuric acid manufacture, in which a partially converted gas stream containing sulfur dioxide and sulfur trioxide is processed for sulfur trioxide removal as sulfuric acid, followed by catalytic conversion of residual sulfur dioxide to sulfur trioxide and recovery of the residual sulfur trioxide as sulfuric acid, are described in the Jan. 25, 1965, issue of Chemical and Engineering News at page 50, and the Dec. 21, 1964, issue of Chemical and Engineering News at pages 42–43. Dual absorption sulfuric acid processes are also described in U.S. patent application No. 499,522 filed Oct. 21, 1965, and now issued as U.S. Pat. No. 3,350,169 and U.S. Pats. Nos. 3,259,459; 3,142,536 and 1,789,460. Other sulfuric acid patents in which process streams are divided include U.S. Pats. Nos. 3,147,074; 2,104,858; 2,023,203 and 1,995,360. The production of sulfuric acid by dual absorption under pressure is described in U.S. patent application No. 544,339 filed Mar. 28, 1966, and now issued as U.S. Pat. No. 3,432,263. In these prior art sequences, the cooled process gas discharged after the first stage of sulfur trioxide absorption is generally heated to the requisite temperature for the initiation of further catalytic oxidation of sulfur dioxide to sulfur trioxide, by passing the cooled gas stream through relatively inefficient gas-to-gas heat exchangers.

SUMMARY OF THE INVENTION

In the present invention, an improved dual absorption sulfuric acid process is provided, in which the process gas stream discharged after the initial absorption of sulfur trioxide and containing residual sulfur dioxide is reheated to ignition temperature for further catalytic sulfur dioxide oxidation in an improved manner. The initial hot process gas stream, produced at a temperature in the range of 800° C. to 1300° C. by combustion of sulfur with pre-dried air, is divided into two portions. A first portion, which is generally at least 80% of the total hot gas stream, is cooled and subjected to the first stage of catalytic oxidation and sulfur trioxide removal. The residual cold gas is heated to ignition temperature in the range of 400° C. to 600° C. for further catalytic oxidation of sulfur dioxide to sulfur trioxide by the addition of the second hot gas portion. The resulting combined gas stream, now at a temperature in the range of about 400° C. to 600° C., is passed to the second stage of catalytic sulfur dioxide oxidation, cooled and scrubbed with concentrated sulfuric acid for final sulfur trioxide removal.

The procedure of the present invention provides several advantages. The expensive prior art gas-to-gas preheaters are obviated, because the second hot process gas portion at a temperature in the range of 800° C. to 1300° C. is directly mixed with the main gas portion prior to the second stage of catalytic conversion, and thus heat is directly provided due to the mixing of the process gas streams and a combined gas stream is directly produced at the requisite temperature for catalytic reaction. Another advantage is that high overall conversions are attained, with a reduction in the loss of unconverted sulfur dioxide and the prevention of air pollution. A further advantage is that the present invention may be applied to existing conventional sulfuric acid facilities, by the provision of a hot gas bypass to an existing dual absorption sulfuric acid installation. In conventional sulfuric acid plants having a single converter followed by a sulfur trioxide absorption tower, the invention is readily employed by providing a hot gas bypass and an ancillary catalytic conversion stage and absorber. Such a modification of an existing facility will also permit a substantial increase in production capacity at relatively minor capital cost.

It is an object of the present invention to provide an improved process for the production of sulfuric acid.

Another object is to provide an improved dual absorption sulfuric acid process.

A further object is to reheat the residual gas stream after intermediate sulfur trioxide absorption in a sulfuric acid process in an improved manner.

An additional object is to reduce sulfur dioxide emission and air pollution in sulfuric acid production facilities.

Still another object is to utilize a portion of the hot gas produced by burning sulfur for direct mix heating of residual sulfur dioxide-containing gas prior to further catalysis in a sulfuric acid process.

An object is to provide a process suitable for the modification of existing sulfuric acid facilities so as to provide a dual absorption process with reduced sulfur dioxide emission and loss.

These and other objects and advantages of the present invention will become evident from the description which follows.

DESCRIPTION OF THE DRAWINGS AND PREFERRED EMBODIMENTS

Referring now to the FIGURE, a flowsheet of a preferred embodiment of the process of the invention is presented. Air stream 1 is pased into drying tower 2 below gas-liquid contact section 3, which is any suitable means for gas-liquid contact, such as a bed of spherical or ring packing, sieve trays or bubble cap plates. Drying liquid stream 4, which typically consists of concentrated sulfuric acid containing in the range of about 93% to 99% sulfuric acid content by weight, is passed into tower 2 above section 3 and flows downwards through the section 3 countercurrent to the rising gas phase, thus serving to remove water vapor from the gas in section 3. The slightly diluted acid stream 5 removed from the bottom of unit 2 is typically of a strength above 90% sulfuric acid content by weight, and is of elevated temperature due to the heat of dilution generated by water vapor absorption into the liquid phase.

Stream 5 is cooled in heat exchanger 6, usually by heat exchange with cooling water, and the resulting cooled acid stream 7 is divided into separated acid stream 8 and recycle acid stream 9. Stream 8 may be a product of the process, however as will appear infra, stream 8 may be further employed within the process as dilution acid. Stream 9 is combined with makeup concentrated sulfuric acid stream 10, which is typically derived from within the process, as will appear infra, as concentrated sulfuric acid of at least about 98% acid content by weight. Stream 4, produced by the combination of streams 9 and 10, is recycled as described supra.

The dried air stream 11 discharged from unit 2 above section 3 is now substantially free of water vapor, and is suitable for usage as process air in sulfuric acid manufacture. As is well known to those skilled in the art, the process air employed in sulfuric acid manufacture by the burning of sulfur must be free of water vapor, in order to prevent the formation of a sulfuric acid mist during catalytic oxidation of sulfur dioxide to sulfur trioxide. Stream 11 is passed together with elemental sulfur stream 12 into sulfur oxidation furnace 13, in which the sulfur stream 12 is combusted with a portion of the free oxygen in the air stream 11. The resulting hot gas stream 14 discharged from furnace 13 principally contains in the range of about 8% to 14% sulfur dioxide content by volume, together with excess free oxygen and inerts such as nitrogen. Stream 14 is at a highly elevated temperature, generally in the range of about 800° C. to 1300° C., and a side stream 15 which is usually less than about 20% of the total volume of stream 14 is removed from stream 14 and utilized in accordance with the present invention, as will appear infra.

A major portion of stream 14 is passed via stream 16 to gas cooler 17, which is usually a steam boiler in which condensate or boiler feed water stream 18 is admitted for cooling purposes, with removal of generated steam via stream 19. The resulting cooled process gas stream 20 discharged from unit 17 is now at a suitable temperature for catalytic oxidation of sulfur dioxide to sulfur trioxide. Stream 20 is generally at a temperature in the range of about 400° C. to 600° C., since below 400° C. the catalytic reaction does not take place in a satisfactory manner due to lack of ignition and reduced catalyst activity, and above 600° C. the catalyst may become overheated with concomitant adverse effects on catalyst activity.

Stream 20 is passed into the top of the multi-stage catalystic converter 21, and flows downwards through the initial catalyst bed 22, in which the exothermic catalytic oxidiation of a portion of the sulfur dioxide content of the gas stream to sulfur trioxide takes place. Catalyst bed 22 consists of a suitable catalyst for sulfur dioxide oxidation, such as platinum, vanadium or vanadium oxide, deposited on a suitable carrier such as kaolin or alumina. The resulting hot process gas discharged below bed 22 is diverted by partition 23, and is removed from unit 21 as stream 24, which is externally cooled prior to further catalytic reaction. Stream 24 is passed to gas cooler 25, which is usually a steam boiler similar in configuration to unit 17 described supra. Condensate or boiler feed water stream 26 is admitted into unit 25 for gas cooling purposes, with removal of generated steam via stream 27. The resulting cooled process gas stream 28 discharged from unit 25 is now at a suitable temperature for further catalytic oxidation of sulfur dioxide, generally in the range of about 400° C. to 600° C.

Stream 28 is passed into unit 21 below partition 23 and above catalyst bed 29, which is similar to bed 22 described supra. The process gas flows downwards through bed 29, and further exothermic catalytic oxidation of sulfur dioxide to sulfur trioxide takes place in bed 29. The hot process gas discharged downwards from bed 29 is cooled by contact with cooling coil 30, through which a cooling fluid stream 31 consisting of ambient air, cooling water, saturated steam or other suitable cooling fluid is circulated. Warmed fluid is discharged from coil 30 via stream 32. The cooled process gas now flows downwards below coil 30 and through catalyst bed 33, which is similar to bed 22, for further catalytic oxidation of sulfur dioxide. The resulting hot process gas discharged downwards from bed 33 is now diverted by partition 62 and passes external to unit 21 as stream 34.

Stream 34 is a hot process gas stream which contains a relatively large proportion of sulfur trioxide, together with a residual proportion of sulfur dioxide, and stream 34 is now processed for the removal of sulfur trioxide as sulfuric acid. Stream 34 is initially cooled in heat exchanger 35, and the resulting cooled process gas stream 36, now at a temperature typically in the range of about 130° C. to 250° C., is passed into gas scrubbing tower 37 below gas-liquid contact section 38, which is generally similar in configuration to section 3 described supra. Stream 36 rises through section 38 countercurrent to the downflowing concentrated liquid sulfuric acid stream 39, which is admitted into unit 37 above section 38 and generally contains at least about 98% sulfuric acid content by weight. The liquid phase in section 38 absorbs sulfur trioxide from the gas phase, with the concomitant formation of further sulfuric acid in solution. The sulfur trioxide absorption and sulfuric acid formation in section 38 serve to generate heat, and the hot concentrated acid stream 40 removed from the bottom of unit 37 is passed through heat exchanger 41 for cooling by heat exchange with cooling water or other suitable coolant. The resultant cooled acid stream 42 is divided into product concentrated liquid sulfuric acid stream 63, which is passed to product utilization or further employed in the process as will appear infra, and recycle acid stream 43. Stream 43 is diluted to a suitable strength above about 98% sulfuric acid content, for further utilization in sulfur trioxide absorption, by the addition of water or dilute acid stream 44. The resulting combined acid stream 39 is recycled as described supra.

A residual porous gas stream 45 is removed from unit 37 above section 38. Stream 45 is substantially free of sulfur trioxide, and principally contains in the range of about 0.1% to 2% sulfur dioxide content by volume, together with free oxygen an inerts. Stream 45 is now heated to a suitable temperature in the range of about 400° C. to 600° C. for further and substantially complete catalytic oxidation of sulfur dioxide to sulfur trioxide in accordance with the present invention. Stream 45 is preferably initially passed through gas to gas heat exchanger 46 for heating to an intermediate temperature below 400° C., by heat exchange with hot fully converted gas. The resulting process gas stream 47, now at an intermediate elevated temperature below 400° C., is further heated to a suitable temperature for catalysis in accordance with the present invention. Stream 47 is combined with stream 15 in gas mixer 48, and the resulting process gas stream 49, now at a temperature in the range of 400° C. to 600° C. and suitable for further catalytic oxidation of sulfur dioxide to sulfur trioxide, is passed into unit 21 below partition 62 and above catalyst bed 50, which is similar to bed 22. The process gas now flows downward through bed 50, and final and substantially complete catalytic oxidation of sulfur dioxide to sulfur trioxide takes place in bed 50. A hot process gas stream 51 is discharged from unit 21 below bed 50, and stream 51 principally contains sulfur trioxide, residual free oxygen and inerts, and is substantially free of sulfur dioxide. Stream 51 usually contains less than about 0.1% sulfur dioxide content by volume.

Stream 51 is passed through heat exchanger 46 and in heat exchange with gas stream 45 as described supra. The resulting cooled gas stream 52 discharged from unit 46 may be further cooled by means not shown, such as by heat exchange with ambient air, to further cool the gas stream to a temperature typically in the range of about 130° C. to 250° C. Stream 52 is now passed into gas scrubbing tower 53, which is similar in configuration and function to tower 38 described supra. The process gas rises in tower 53 through gas-liquid contact section 54, which is usually similar in configuration to section 3 described supra, and concentrated liquid sulfuric acid stream 55 is admitted into unit 53 above section 54 and flows downwards through section 54, thus serving to absorb sulfur trioxide from the gas stream and form further sulfuric acid in the liquid phase. The resulting heated and further concentrated liquid sulfuric acid solution is removed from the bottom of tower 53 via stream 56, which is cooled in heat exchanger 57. The cooled concentrated sulfuric acid stream 58 discharged from unit 57 is divided into product acid stream 64, which may be passed to product utilization or further employed in the process as will appear infra, and recycle concentrated sulfuric acid stream 59. The recycle stream 59 is now diluted to an acid strength suitable for further sulfur trioxide absorption, generally of at least about 98% sulfuric acid content by weight, by the addition of stream 60,, which consists of water or dilute sulfuric acid. The resulting combined liquid stream 55 is recycled as described supra. The residual tail gas stream 61 is removed from unit 53 above section 54, and is usually discharged to atmosphere. Stream 61 is substantially free of sulfur oxides, usually containing less than about 0.1% sulfur oxides content by volume.

Numerous alternatives within the scope of the present invention, besides those mentioned supra, will occur to those skilled in the art. The ranges of process variables such as temperature and process stream compositions enumerated supra constitute preferred embodiments of the invention for optimum practice of the process, and the invention may be practiced outside of these ranges in suitable instances, except that stream 14 must be produced at a temperature above 800° C. in order that stream 15 will have a suitable heating effect in unit 48, and the process streams passing to catalysis such as streams 20, 28 and 49 must generally be at a temperature in the range of about 400° C. to 600° C. for the reasons discussed supra.

Stream 1 may be dried in some cases by the provision of a desiccant or other drying liquid besides 93% to 99% sulfuric acid solution. In most instances, the flow rate of stream 15 will be less than about 20% of the total flow rate of stream 14 as discharged from unit 13, however in some instances stream 15 may be of a magnitude somewhat greater than 20% of stream 14, such as if unit 46 is omitted and stream 45 passes directly into unit 48. In this case, stream 49 will usually be passed through a plurality of stages of catalytic conversion, with interstage cooling of the process gas stream between catalyst beds. In some instances, such as when the sulfuric acid process is combined with an associated chemical process, streams 18 or 26 or both may consist of a process fluid which is heated or vaporized. In addition, a suitable process fluid may be circulated through unit 35 in heat exchange with stream 34, so as to produce heating or vaporization of the process fluid. In some instances, unit 46 and its function may be omitted, with stream 45 passing directly via stream 47 to unit 48. In this case, all of the requisite heating of stream 45 to a temperature in the range of 400° C. to 600° C. will be provided by the addition of stream 15, and stream 51 will be cooled to produce stream 52 by the provision of a suitable heat exchanger such as unit 35, through which cooling water or a process fluid would be circulated. Stream 8 may be utilized as a component or all of streams 44 or 60 or both. In this case, streams 63 and 64 would be the main products of the process. In other instances, streams 63 or 64 or both may be partially or totally utilized in the process as stream 10, in which case stream 8 would be the main product of the process. It will be evident that in some instances both 93% to 99% sulfuric acid derived from stream 8 and 98% sulfuric acid derived from streams 63 and 64 may be products of the process, if desired.

In instances when the invention is applied to an existing conventional sulfuric acid process, in which the facility is provided with a single multistage converter, followed by passage of the converter exit gas to a single absorber with discharge of the absorber tail gas to atmosphere, the conventional facility may readily be modified in accordance with the present invention, to provide greater overall output of sulfuric acid and reduced sulfur oxides content in the tail gas. In this case, the process air flow and throughput of sulfur to the sulfur combustion furnace would be slightly increased, and a side stream of hot combustion gas would be added to the tail gas from the absorption tower, which could have a higher initial sulfur dioxide content due to higher gas throughput through the main converter. The combined gas stream, formed at a temperature in the range of 400° C. to 600° C. in accordance with the present invention and suitable for further catalytic oxidation of sulfur dioxide, is then passed through a second catalytic converter, which may be a single bed unit or a multistage unit provided with interbed gas cooling facilities. The resulting process gas discharged from the second converter would then be passed through a second sulfur trioxide absorption tower, from which the final tail gas containing a negligible proportion of residual sulfur oxides would be discharged to atmosphere.

An example of an industrial application of the process of the present invention will now be described.

EXAMPLE

The procedure of the present invention was applied to an operating sulfuric acid facility, which produced 100 tons per day of sulfuric acid. The existing facility operated with a process feed gas generated by the sulfur burning furnace which contained 10.5% sulfur dioxide content, and the existing facility attained an overall 94.5% conversion of sulfur to sulfuric acid, with 0.5% sulfur dioxide in the stack gas. The existing facility was modified in accordance with the present invention as discussed supra, by the addition of an auxiliary two-stage converter into which a mixture of bypassed gas from the sulfur furnace and heated stack gas was passed. The final converted gas was passed to an auxiliary absorber, from which a final stack gas containing 0.05% sulfur dioxide was discharged.

The invention therefore resulted in the recovery of 90% of the sulfur dioxide from the original stack gas as sulfuric acid. Following are operating conditions relative to pertinent process streams.

| Stream No. | Temp., °C. | Sulfur dioxide content, percent by volume | Flow rate, cubic meters per minute |
|---|---|---|---|
| 45 | 70 | 0.5 | 169 |
| 47 | 340 | 0.5 | 169 |
| 15 | 925 | 10.5 | 19.8 |
| 49 | 438 | 1.55 | 189 |
| 51 [1] | 438 | 0.05 | 188 |
| 52 | 172 | 0.05 | 188 |
| 61 | 70 | 0.05 | 186 |

[1] Stream 51 is shown as discharged from the second stage of the two-stage auxiliary converter. Interstage gas cooling between the two stages from a temperature of 475° C. to 425° C. was obtained in an auxiliary gas-to-gas heat exchanger by heat exchange with stream 47, which was thereby heated from 340° C. to 392° C. prior to the addition of stream 15.

What is claimed is:

1. In a process for the production of sulfuric acid in which sulfur is burned with air, said air being substantially free of water vapor, whereby a hot combustion effluent process gas stream containing sulfur dioxide and free oxygen is produced at a temperature in the range of about 800° C. to 1300° C., said hot combustion effluent process gas stream is cooled to a temperature in the range of about 400° C. to 600° C., a portion of the sulfur dioxide content of the cooled process gas stream is catalytically converted to sulfur trioxide by passing the cooled process gas stream through first catalytic conversion means, the resulting hot partially converted process gas stream is cooled, the cooled partially converted gas stream is contacted with a first stream of concentrated liquid sulfuric acid solution, whereby the sulfur trioxide in said partially converted process gas stream is absorbed in said first stream of liquid sulfuric acid solution to form further sulfuric acid, and a residual process gas stream is produced which contains sulfuric dioxide and is substantially free of sulfur trioxide, said residual process gas stream is heated to a temperature in the range of 400° C. to 600° C., a major portion of the sulfur dioxide content of the heated residual process gas stream is catalytically converted to sulfur trioxide by passing the heated residual process gas stream through second catalytic conversion means, the resulting hot fully converted process gas stream is cooled, and the cooled fully converted process gas stream is contacted with a second stream of concentrated liquid sulfuric acid solution, whereby the sulfur trioxide in said fully converted process gas stream is absorbed in said second stream of liquid sulfuric acid solution to form further sulfuric acid, and a final process gas stream is discharged as a tail gas substantially free of sulfur oxides, the improved method of heating said residual process gas stream to a temperature in the range of about 400° C. to 600° C., prior to passing the heated residual process gas stream through said second catalytic conversion means which comprises
 (a) withdrawing a portion of said hot combustion effluent process gas stream at a temperature in the range of about 800° C. to 1300° C., and
 (b) adding said withdrawn hot combustion effluent process gas stream portion to said residual process gas stream, whereby said hot portion mixes with said residual process gas stream and raises the temperature of said residual process gas stream to the range of about 400° C. to 600° C.

2. The process of claim 1, in which said resulting hot fully converted process gas stream is cooled by indirect heat exchange with said residual process gas stream, whereby said residual process gas stream is heated, prior to the addition of said withdrawn hot combustion effluent gas stream portion to said residual process gas stream.

3. The process of claim 1, in which said resulting hot partially converted process gas stream is cooled to a temperature in the range of about 130° C. to 250° C., prior to contact with said first stream of concentrated liquid sulfuric acid solution, and said first stream of liquid sulfuric acid solution contains at least about 98% sulfuric acid content by weight.

4. The process of claim 1, in which said resulting hot fully converted process gas stream is cooled to a temperature in the range of about 130° C. to 250° C., prior to contact with said second stream of concentrated liquid sulfuric acid solution, and said second stream of liquid sulfuric acid solution contains at least about 98% sulfuric acid content by weight.

5. The process of claim 1, in which said hot combustion effluent process gas stream produced at a temperature in the range of about 800° C. to 1300° C. by burning sulfur with air contains in the range of about 8% to 14% sulfur dioxide content by volume, and said residual process gas stream contains in the range of about 0.1% to 2% sulfur dioxide content by volume.

6. The process of claim 1, in which said portion of said hot combustion effluent process gas stream withdrawn according to step (a) is less than about 20% of the total combustion effluent process gas stream produced by burning sulfur with air.

7. The process of claim 1, in which said first catalytic conversion means comprises a plurality of catalyst bed stages through which said cooled process gas stream is passed in series, said first catalytic conversion means being provided with cooling mean for indirect heat exchange cooling of said process gas stream to a reduced temperature in the range of about 400° C. to 600° C. between catalyst bed stages.

References Cited

UNITED STATES PATENTS

| | | | |
|---|---|---|---|
| 3,350,169 | 10/1967 | Rinckhoff | 23—168 |
| 1,789,460 | 1/1931 | Clark | 23—176 |

FOREIGN PATENTS

| | | |
|---|---|---|
| 1,186,838 | 2/1965 | Germany. |
| 717,904 | 9/1965 | Canada. |
| 661,999 | 4/1963 | Canada. |

OSCAR R. VERTIZ, Primary Examiner

C. B. RODMAN, Assistant Examiner

U.S. Cl. X.R.

23—176